E. M. Fowler,
Preserving Wood.
No. 112,136. Patented Feb. 28. 1871.
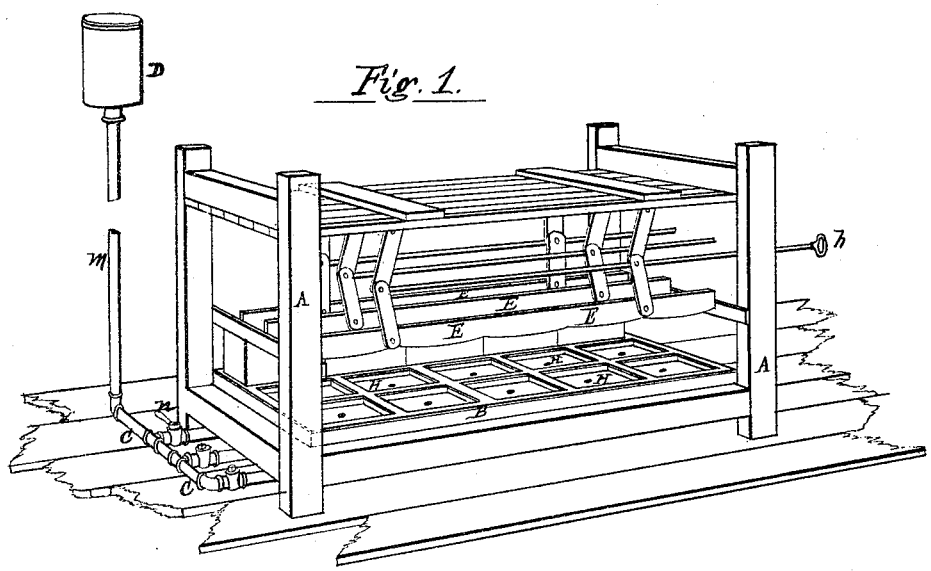
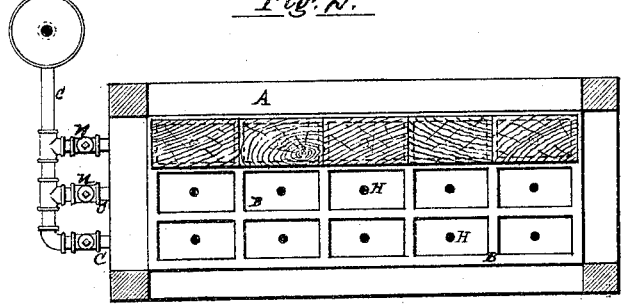
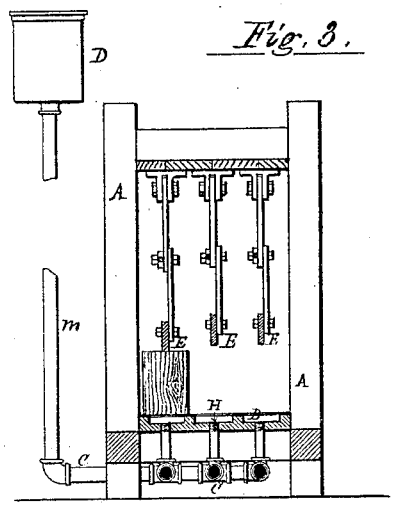
Witness: H. G. McGonyal, Henry Rogge
Inventor: Edgar M. Fowler

United States Patent Office.

EDGAR M. FOWLER, OF NEW YORK, N. Y.*

Letters Patent No. 112,136, dated February 28, 1871.

IMPROVEMENT IN PRESERVING BLOCKS OF WOOD.

The Schedule referred to in these Letters Patent and making part of the same.

I, EDGAR M. FOWLER, of the city, county, and State of New York, have invented certain Improvements in Apparatus for Preserving Wood, of which the following is a specification.

Nature and Object.

The nature of my invention consists in the application of hydrostatic pressure or a force exerted in a similar manner to the ends of wooden blocks, so as to force the sap or similar moisture from said blocks and inject into the pores of the wood such substances as will prevent decay, and this apparatus is specially intended for preserving blocks for wood pavements, and is therefore constructed to be readily portable, and so simple in its operation that the most unskilled laborer can quickly comprehend its operations and undertake its management.

Drawing.

Figure 1 is a perspective view of the entire apparatus as it would appear located on a flooring of loose boards, as shown.

Figure 2 is a plan of the tank and receivers for the blocks with one row of blocks in position, the upper portion of the frame being removed.

Figure 3 is an end view of the machine in elevation, showing one row of blocks in position to receive the liquid pressure.

A is the frame of the machine, of any desired size and shape to hold the tank B upon which the blocks are placed to receive the liquid.

Said tank is sufficiently strong to sustain the pressure of a column of liquid connected with said tank, as shown by the pipes C, which are connected with the upright pipe M, upon which a funnel, D, is placed for receiving the liquid at a sufficient height to give the desired pressure. This pressure may also be given by other means, as pumps, though the hydrostatic action will be found to be the cheapest and most regular in its operation.

Said tank is divided into a series of chambers corresponding with the ends of the blocks to be treated, and over the top of said divisions are openings made in the top of the tank, as shown at H, corresponding to the shape of the blocks, and nearly as large as the blocks on their sides.

Upon the upper portions of the tank still left gaskets of rubber or some similar elastic substance are placed to serve as cushions to the lower ends of the blocks, to prevent leakage of the liquid when under pressure.

To hold the blocks in position there are bars E, sliding in guides at each end of the frame and suspended in toggle-levers, which are attached to the upper portion of the frame and are connected to levers, h, conveniently placed at the end of the frame for the operator to work said toggle-levers to produce the desired pressure or relieve it at pleasure.

The blocks are placed on end on the gaskets around the spaces in the tank; the bar E is forced down upon the blocks to hold them in position to receive the pressure of the liquid which is introduced at the funnel D, and the pressure of the column of liquid may be made so great as to drive the sap and solvent substances upward from the blocks and be replaced by any of the well-known preparations for such purposes, such as carbolic acid, or some of the products of petroleum, or combinations of zinc, as in the process of Kyanizing or Burnettizing.

When the liquid has been driven through the blocks, or only one row of them, the pressure is stopped by the cocks N, corresponding to that row, and they can be removed without stopping the operation in the other rows still under pressure; consequently the operation may be continued, as the blocks can be supplied in the several rows whenever desired.

Claims.

I claim—

1. The process herein described for impregnating blocks of wood, the same consisting of devices for holding the blocks in position so as to receive the injected liquid at the end or through the blocks by means of hydraulic pressure, as described, and for the purposes set forth.

2. The tanks, gaskets, pipes, and in combination with the binding-levers for holding the blocks in position, as described.

EDGAR M. FOWLER.

Witnesses:
H. G. McGONGAL,
HENRY ROGGR.

*Assignor to Margaretta B. McGonegal of same place.